United States Patent
Kibby et al.

(10) Patent No.: US 8,377,996 B2
(45) Date of Patent: *Feb. 19, 2013

(54) ZEOLITE SUPPORTED COBALT HYBRID FISCHER-TROPSCH CATALYST

(75) Inventors: Charles L. Kibby, Benicia, CA (US); Kandaswamy Jothimurugesan, Hercules, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/031,341

(22) Filed: Feb. 21, 2011

(65) Prior Publication Data

US 2011/0144219 A1  Jun. 16, 2011

Related U.S. Application Data

(62) Division of application No. 12/343,534, filed on Dec. 24, 2008, now abandoned.

(51) Int. Cl.
   *C07C 27/00* (2006.01)
(52) U.S. Cl. ....................................................... 518/715
(58) Field of Classification Search .................... 518/715
   See application file for complete search history.

(56) References Cited

U.S. PATENT DOCUMENTS

| | | | | |
|---|---|---|---|---|
| 4,086,262 | A * | 4/1978 | Chang et al. | 518/716 |
| 4,294,725 | A * | 10/1981 | Fraenkel et al. | 502/75 |
| 4,444,901 | A * | 4/1984 | Pesa et al. | 502/80 |
| 4,617,320 | A * | 10/1986 | Coughlin et al. | 518/719 |
| 4,652,538 | A * | 3/1987 | Rabo et al. | 502/66 |
| 4,670,414 | A * | 6/1987 | Kobylinski et al. | 502/174 |
| 7,300,959 | B2 * | 11/2007 | Vogt et al. | 518/719 |
| 7,943,674 | B1 * | 5/2011 | Kibby et al. | 518/715 |
| 2007/0209968 | A1 * | 9/2007 | Euzen | 208/108 |
| 2007/0244206 | A1 * | 10/2007 | Lvovich et al. | 518/716 |

FOREIGN PATENT DOCUMENTS

| | | |
|---|---|---|
| EP | 2514525 | 10/2012 |
| RU | 2295387 | * 3/2007 |

* cited by examiner

*Primary Examiner* — Elizabeth Wood
(74) *Attorney, Agent, or Firm* — Karen DiDomenicis; Richard Schulte

(57) ABSTRACT

A method for forming a catalyst for synthesis gas conversion comprises impregnating a zeolite extrudate using a solution, for example, a substantially non-aqueous solution, comprising a cobalt salt to provide an impregnated zeolite extrudate and activating the impregnated zeolite extrudate by a reduction-oxidation-reduction cycle.

8 Claims, No Drawings

ZEOLITE SUPPORTED COBALT HYBRID FISCHER-TROPSCH CATALYST

This application is a divisional of application Ser. No. 12/343,534 filed Dec. 24, 2008 now abandoned and claim the benefit thereof.

FIELD

The present disclosure relates to a process for the conversion of synthesis gas to liquid hydrocarbons in the presence of a zeolite supported cobalt catalyst, to the preparation of such catalyst, and to the catalyst. More particularly, the present disclosure relates to conversion of synthesis gas to liquid hydrocarbons using a catalyst comprising cobalt on a zeolite support that has been subjected to an activation treatment to provide improved activity and selectivity.

BACKGROUND

High quality fuels remain in increasing demand with respect to the crude oil crisis and environmental impact. Fischer-Tropsch synthesis, which involves the production of hydrocarbons by the catalyzed reaction of CO and hydrogen, can convert natural gas derived synthesis gas to liquid fuels and high-value chemicals. Fischer-Tropsch synthesis is one of the more attractive direct and environmentally acceptable paths to high quality transportation fuels.

Fischer-Tropsch catalysts are typically based on group VIII metals such as, for example, Fe, Co, Ni and Ru, with Fe and Co being the most popular. The product distribution over such catalysts is non-selective and is generally governed by the Anderson-Schulz-Flory (ASF) polymerization kinetics.

What is needed is a Fischer-Tropsch catalyst that limits product chain growth in the Fischer-Tropsch reaction, and a method for forming such a Fischer-Tropsch catalyst comprising cobalt, with its low water-gas shift activity and ready availability.

SUMMARY

Provided is a method for forming a catalyst for synthesis gas conversion. The method comprises impregnating a zeolite extrudate using a solution comprising a cobalt salt to provide an impregnated zeolite extrudate and activating the impregnated zeolite extrudate by a reduction-oxidation-reduction cycle. In an embodiment, the solution comprises a substantially non-aqueous solution. Also provided is a hybrid Fischer-Tropsch catalyst comprising a zeolite extrudate impregnated with cobalt.

Zeolite supported mono- and bimetallic catalysts have been found to be capable of limiting product chain growth in the Fischer-Tropsch reaction. Cobalt is the preferred Fischer-Tropsch active metal for conversion of natural gas derived synthesis gases because of its low water-gas shift activity and ready availability. Impregnation of a zeolite using a substantially non-aqueous cobalt solution followed by activation by a reduction-oxidation-reduction cycle reduces cobalt ion-exchange with zeolite acid sites, thereby increasing the overall activity of the zeolite component.

DETAILED DESCRIPTION

Impregnation methods followed by reduction-oxidation-reduction activation are employed for making a practical hybrid Fischer-Tropsch catalyst. Cobalt-ruthenium/zeolite catalysts with high activities for synthesis gas conversion to hydrocarbon liquids have been prepared using commercially available, alumina bound zeolite extrudates. With cobalt nitrate, metal loading in a single step impregnation is limited to about 6-7 weight % cobalt for these alumina bound zeolites. Thus, multiple impregnations are often needed, with intervening drying and calcination treatments to disperse and decompose the metal salts. The cobalt content was varied from 5 weight % to 15 weight %. Usually, calcination in air produced materials with lower activities than those that were formed by direct reduction of cobalt nitrate. However, direct reduction on a large scale is considered to be undesirable since it is very exothermic and it produces a pyrophoric catalyst that must then be passivated before it can be handled in air. A low temperature reduction-oxidation-reduction cycle has been found superior to a single reduction step for the activation of cobalt-ruthenium/zeolite catalysts for synthesis gas conversion.

Use of zeolite extrudates has been found to be beneficial, for the relatively larger zeolite extrudate particles will cause less pressure drop within a reactor and be subject to less attrition than zeolite powder or even granular zeolite (e.g., having a particle size of about 300-1000 microns). Formation of particles from zeolite powder or granular zeolite plus Co/alumina and a binder, to be sized equivalent to zeolite extrudate (i.e., to avoid pressure drop and attrition) would result in blinding of cobalt sites and would probably still result in some ion exchange during the required drying and calcination steps, thus lowering the activity and selectivity of the resultant catalyst.

Methods of formation of zeolite extrudates are readily known to those of ordinary skill in the art. Wide variations in macroporosity are possible with such extrudates. For the present application, without wishing to be bound by any theories, it is believed that as high a macroporosity as possible, consistent with high enough crush strength to enable operation in long reactor tubes, will be advantageous in minimizing diffusion constraints on activity and selectivity. The zeolite-mediated Fischer-Tropsch synthesis is not as diffusion-limited as that of normal Fischer-Tropsch synthesis, since the pores of the presently disclosed zeolite supported Fischer-Tropsch catalyst stay open during operation, whereas the pores of a normal Fischer-Tropsch catalyst fill with oil (melted wax).

In extrudate formation, strength is produced in a calcination step at high temperature. The temperature is high enough to cause solid state reactions between cobalt oxides and alumina or aluminosilicate portions of the material, to form very stable, essentially non-reducible phases such as spinels. Consequently, it is vital that the metal be added after the extrudate has been formed and has already undergone calcination.

As used herein, the phrase "hybrid Fischer-Tropsch catalyst" refers to a Fischer-Tropsch catalyst comprising a Fischer-Tropsch base component as well as a component containing the appropriate functionality to convert in a single-stage the primary Fischer-Tropsch products into desired products (i.e., minimize the amount of heavier, undesirable products). Thus, the combination of a Fischer-Tropsch component displaying high selectivity to sort-chain α-olefins and oxygenates with zeolite(s) results in an enhanced gasoline selectivity and an increased concentration of high-octane branched and aromatic hydrocarbons by promoting oligomerization, cracking, isomerization, and aromatization reactions on the zeolite acid sites. Gasoline-range isoparaffins also can be produced in a single reactor using hybrid catalysts by combining a cobalt-based Fischer-Tropsch component with an acidic or bifunctional zeolite component. Primary waxy products formed on the cobalt component are cracked/ hydrocracked (i.e., by the acidic zeolite component) into mainly branched hydrocarbons with limited formation of aromatics, a less desirable component in reformulated gasolines due to environmental concerns. In particular, in a single-stage Fischer-Tropsch reaction, the presently disclosed hybrid Fischer-Tropsch catalyst provides:

0-20, for example, 5-15 or 8-12, weight % $CH_4$;
0-20, for example, 5-15 or 8-12, weight % $C_2$-$C_4$;
50-95, for example, 60-90 or 75-80, weight % $C_{5+}$; and
0-8 weight % $C_{21+}$.

As used herein, the phrase "zeolite supported cobalt catalyst" refers to catalyst wherein the cobalt metal is distributed as small crystallites upon the zeolite support. The cobalt content of the zeolite supported cobalt catalyst can depend on the alumina content of the zeolite. For example, for an alumina content of about 20 weight % to about 99 weight % based upon support weight, the catalyst can contain, for example, from about 1 to about 20 weight % cobalt, preferably 5 to about 15 weight % cobalt, based on total catalyst weight, at the lowest alumina content. At the highest alumina content the catalyst can contain, for example, from about 5 to about 30 weight % cobalt, preferably from about 10 to about 25 weight % cobalt, based on total catalyst weight.

It has been found that synthesis gas comprising hydrogen and carbon monoxide can be selectively converted under synthesis gas conversion conditions to liquid hydrocarbons with a catalyst prepared by subjecting a zeolite supported cobalt catalyst to an activation procedure comprising the steps, in sequence, of (A) reduction in hydrogen, (B) oxidation in an oxygen-containing gas, and (C) reduction in hydrogen, the activation procedure being conducted at a temperature below 500° C. It has been found that the activation procedure of the present disclosure provides zeolite supported cobalt catalyst with improved reaction rates when the catalyst is prepared by impregnation of a zeolite support with cobalt. Moreover, the activation procedure of the present disclosure can significantly improve activity of promoted, zeolite supported cobalt catalyst, wherein a promoter such as, for example, Ru, Rh, Pd, Cu, Ag, Au, Zn, Cd, Hg, and/or Re has been previously added to improve activity. The catalyst of the present disclosure is produced by subjecting a zeolite supported cobalt catalyst to an activation procedure including the steps of (i) reduction, (ii) oxidation, and (iii) reduction, herein termed "ROR activation" while under a temperature below 500° C., for example, below 450° C. By subjecting the zeolite supported cobalt catalyst to ROR activation, the activity of the resultant catalyst can be increased by as much as about 100% using the activation procedure of the present disclosure.

A zeolite support is a molecular sieve that contains silica in the tetrahedral framework positions. Examples include, but are not limited to, silica-only (silicates), silica-alumina (aluminosilicates), silica-boron (borosilicates), silica-germanium (germanosilicates), alumina-germanium, silica-gallium (gallosilicates) and silica-titania (titanosilicates), and mixtures thereof.

Molecular sieves, in turn, are crystalline materials that have regular passages (pores). If examined over several unit cells of the structure, the pores will form an axis based on the same units in the repeating crystalline structure. While the overall path of the pore will be aligned with the pore axis, within a unit cell, the pore may diverge from the axis, and it may expand in size (to form cages) or narrow. The axis of the pore is frequently parallel with one of the axes of the crystal. The narrowest position along a pore is the pore mouth. The pore size refers to the size of the pore mouth. The pore size is calculated by counting the number of tetrahedral positions that form the perimeter of the pore mouth. A pore that has 10 tetrahedral positions in its pore mouth is commonly called a 10-ring pore. Pores of relevance to catalysis in this application have pore sizes of 8 rings or greater. If a molecular sieve has only one type of relevant pore with an axis in the same orientation to the crystal structure, it is called 1-dimensional. Molecular sieves may have pores of different structures or may have pores with the same structure but oriented in more than one axis related to the crystal. In these cases, the dimensionality of the molecular sieve is determined by summing the number of relevant pores with the same structure but different axes with the number of relevant pores of different shape.

Examplary zeolite supports of the present disclosure include, but are not limited to, those designated SSZ-13, SSZ-33, SSZ-46, SSZ-53, SSZ-55, SSZ-57, SSZ-58, SSZ-59, SSZ-64, ZSM-5, ZSM-11, ZSM-12, TS-1, MTT (e.g., SSZ-32, ZSM-23 and the like), H—Y, BEA (zeolite Beta), SSZ-60 and SSZ-70. These molecular sieves each contain silicon as the major tetrahedral element, have 8 to 12 ring pores, and are microporous molecular sieves, meaning having pore mouths of 20 rings or less.

The zeolite supports can have an External Surface Area of between about 100 $m^2/g$ and about 300 $m^2/g$, for example, about 180 $m^2/g$. Micropore value for 80% ZSM-5 should be between about 90 and 112 µL/g, with lower values imply some occlusion or loss of micropore structure. BET Surface Area is a sum of external area and micropore area (more properly calculated as a volume). The zeolite supports can further have Porosity of between about 30 and 80%, Total Intrusion Volume of between about 0.25 and 0.60 cc/g, and Crush Strength of between about 1.25 and 5 lb/mm. Si/Al ratio (for zeolite component only) can be between about 10 and 100.

A promoter, such as ruthenium or the like may be included in the catalyst of the present disclosure if desired. For a catalyst containing about 10 weight % cobalt, the amount of ruthenium can be from about 0.01 to about 0.50 weight %, for example, from about 0.05 to about 0.25 weight % based upon total catalyst weight. The amount of ruthenium would accordingly be proportionately higher or lower for higher or lower cobalt levels, respectively. A catalyst level of about 10 weight % have been found to best for 80 weight % ZSM-5 and 20 weight % alumina. The amount of cobalt can be increased as amount of alumina increases, up to about 20 weight % Co.

The ROR activation procedure of the present disclosure may be used to improve activity of the zeolite supported catalyst of the present disclosure. Thus, any technique well known to those having ordinary skill in the art to distend the catalytic metals in a uniform manner on the catalyst zeolite support is suitable, assuming they do not promote ion exchange with zeolite acid sites.

The method employed to deposit the catalytic metals of the present disclosure onto the zeolite support can involve an impregnation technique using a substantially non-aqueous solution containing soluble cobalt salt and, if desired, a soluble promoter metal salt, e.g., ruthenium salt, in order to achieve the necessary metal loading and distribution required to provide a highly selective and active catalyst.

Initially, the zeolite support can be treated by oxidative calcination at a temperature in the range of from about 450° to about 900° C., for example, from about 600° to about 750° C. to remove water and any organics from the zeolite support.

Meanwhile, non-aqueous organic solvent solution of a cobalt salt, and, if desired, aqueous or non-aqueous organic solvent solutions of ruthenium salts, for example, are prepared. Any suitable ruthenium salt, such as ruthenium nitrate, chloride, acetate or the like can be used. Aqueous solutions for the promoters can be used in very small amounts. As used herein, the phrase "substantially non-aqueous" refers to a solution that includes at least 95 volume % non-aqueous solution. In general, any metal salt which is soluble in the organic solvent of the present disclosure and will not have a poisonous effect on the catalyst can be utilized.

The non-aqueous organic solvent is a non-acidic liquid which is formed from moieties selected from the group consisting of carbon, oxygen, hydrogen and nitrogen, and possesses a relative volatility of at least 0.1. The phrase "relative volatility" refers to the ratio of the vapor pressure of the solvent to the vapor pressure of acetone, as reference, when measured at 25° C.

It has been found that an aqueous solution containing a cobalt salt migrates into the microporous hydrophilic zeolite, and the cobalt replaces zeolite acid sites. In contrast, use of a non-aqueous solution containing a cobalt salt minimizes replacement of zeolite acid sites with metal. In particular, when cobalt ions in solution exchange with acidic protons in the zeolite, the cobalt ions essentially titrate the acidic sites, since the ability of the cobalt ion to promote acid-catalyzed reactions is much less than that of the protons they displace. This would not matter if the cobalt in those positions were easy to reduce during catalyst activation, because reduction by hydrogen during that process would regenerate the proton acidity according to the equation: $Co^{+2}+H_2=Co^0+2H^+$. Unfortunately, the ion exchange sites are quite stable positions for cobalt and cobalt ions there are not readily reduced during normal activation procedures. As the reduction in the amount of reducible Co also decreases the activity of the Fischer-Tropsch component in the catalyst, it is bad for both functions.

Suitable solvents include, for example, ketones, such as acetone, butanone (methyl ethyl ketone); the lower alcohols, e.g., methanol, ethanol, propanol and the like; amides, such as dimethyl formamide; amines, such as butylamine; ethers, such as diethylether and tetrahydrofuran; hydrocarbons, such as pentane and hexane; and mixtures of the foregoing solvents. In an embodiment, the solvents are acetone, for cobalt nitrate or tetrahydrofuran.

Suitable cobalt salts include, for example, cobalt nitrate, cobalt acetate, cobalt carbonyl, cobalt acetylacetonate, or the like. Likewise, any suitable ruthenium salt, such as ruthenium nitrate, chloride, acetate or the like can be used. In an embodiment, ruthenium acetylacetonate is used. In general, any metal salt which is soluble in the organic solvent of the present disclosure and will not have a poisonous effect on the metal catalyst or on the acid sites of the zeolite can be utilized.

The calcined zeolite support is then impregnated in a dehydrated state with the substantially non-aqueous, organic solvent solution of the metal salts. Thus, the calcined zeolite support should not be unduly exposed to atmospheric humidity so as to become rehydrated.

Any suitable impregnation technique can be employed including techniques well known to those skilled in the art so as to distend the catalytic metals in a uniform thin layer on the catalyst zeolite support. For example, the cobalt along with the oxide promoter can be deposited on the zeolite support material by the "incipient wetness" technique. Such technique is well known and requires that the volume of substantially non-aqueous solution be predetermined so as to provide the minimum volume which will just wet the entire surface of the zeolite support, with no excess liquid. Alternatively, the excess solution technique can be utilized if desired. If the excess solution technique is utilized, then the excess solvent present, e.g., acetone, is merely removed by evaporation.

Next, the substantially non-aqueous solution and zeolite support are stirred while evaporating the solvent at a temperature of from about 25° to about 50° C. until "dryness".

The impregnated catalyst is slowly dried at a temperature of from about 110° to about 120° C. for a period of about 1 hour so as to spread the metals over the entire zeolite support. The drying step is conducted at a very slow rate in air.

The dried catalyst may be reduced directly in hydrogen or it may be calcined first. In the case of impregnation with cobalt nitrate, direct reduction can yield a higher cobalt metal dispersion and synthesis activity, but reduction of nitrates is difficult to control and calcination before reduction is safer for large scale preparations. Also, a single calcination step to decompose nitrates is simpler if multiple impregnations are needed to provide the desired metal loading. Reduction in hydrogen requires a prior purge with inert gas, a subsequent purge with inert gas and a passivation step in addition to the reduction itself, as described later as part of the ROR activation. However, impregnation of cobalt carbonyl must be carried out in a dry, oxygen-free atmosphere and it must be decomposed directly, then passivated, if the benefits of its lower oxidation state are to be maintained.

The dried catalyst is calcined by heating slowly in flowing air, for example 10 cc/gram/minute, to a temperature in the range of from about 200° to about 350° C., for example, from about 250° to about 300° C., that is sufficient to decompose the metal salts and fix the metals. The aforesaid drying and calcination steps can be done separately or can be combined. However, calcination should be conducted by using a slow heating rate of, for example, 0.5° to about 3° C. per minute or from about 0.5° to about 1° C. per minute and the catalyst should be held at the maximum temperature for a period of about 1 to about 20 hours, for example, for about 2 hours.

The foregoing impregnation steps are repeated with additional substantially non-aqueous solutions in order to obtain the desired metal loading. Ruthenium and other promoter metal oxides are conveniently added together with cobalt, but they may be added in other impregnation steps, separately or in combination, either before, after, or between impregnations of cobalt.

After the last impregnation sequence, the loaded catalyst zeolite support is then subjected to the ROR activation treatment of the present disclosure. The ROR activation treatment of the present disclosure must be conducted at a temperature considerably below 500° C. in order to achieve the desired increase in activity and selectivity of the cobalt-impregnated catalyst. Temperatures of 500° C. or above reduce activity and liquid hydrocarbon selectivity of the cobalt-impregnated catalyst. Suitable ROR activation temperatures are below 500° C., preferably below 450° C. and most preferably, at or below 400° C. Thus, ranges of 100° or 150° to 450° C., for example, 250° to 400° C. are suitable for the reduction steps. The oxidation step should be limited to 200° to 300° C. These activation steps are conducted while heating at a rate of from about 0.1° to about 5° C., for example, from about 0.1° to about 2° C.

The impregnated catalyst can be slowly reduced in the presence of hydrogen. If the catalyst has been calcined after each impregnation, to decompose nitrates or other salts, then the reduction may be performed in one step, after an inert gas purge, with heating in a single temperature ramp (e.g., 1° C./min.) to the maximum temperature and held at that temperature, from about 250° or 300° to about 450° C., for example, from about 350° to about 400° C., for a hold time of 6 to about 65 hours, for example, from about 16 to about 24 hours. Pure hydrogen is preferred in the first reduction step. If nitrates are still present, the reduction is best conducted in two steps wherein the first reduction heating step is carried out at a slow heating rate of no more than about 5° C. per minute, for example, from about 0.1° to about 1° C. per minute up to a maximum hold temperature of 200° to about 300° C., for example, 200° to about 250° C., for a hold time of from about 6 to about 24 hours, for example, from about 16 to about 24 hours under ambient pressure conditions. In the second treating step of the first reduction, the catalyst can be heated at from about 0.5° to about 3° C. per minute, for example, from about 0.1° to about 1° C. per minute to a maximum hold temperature of from about 250° or 300° up to about 450° C., for example, from about 350° to about 400° C. for a hold time of 6 to about 65 hours, for example, from about 16 to about 24 hours. Although pure hydrogen is preferred for these reduction steps, a mixture of hydrogen and nitrogen can be utilized.

Thus, the reduction may involve the use of a mixture of hydrogen and nitrogen at 100° C. for about one hour; increasing the temperature 0.5° C. per minute until a temperature of 200° C.; holding that temperature for approximately 30 minutes; and then increasing the temperature 1° C. per minute until a temperature of 350° C. is reached and then continuing the reduction for approximately 16 hours. Reduction should be conducted slowly enough and the flow of the reducing gas maintained high enough to maintain the partial pressure of water in the offgas below 1%, so as to avoid excessive steaming of the exit end of the catalyst bed. Before and after all reductions, the catalyst must be purged in an inert gas such as nitrogen, argon or helium.

The reduced catalyst is passivated at ambient temperature (25°-35° C.) by flowing diluted air over the catalyst slowly enough so that a controlled exotherm of no larger than +50° C. passes through the catalyst bed. After passivation, the catalyst is heated slowly in diluted air to a temperature of from about 300° to about 350° C. (preferably 300° C.) in the same manner as previously described in connection with calcination of the catalyst.

The temperature of the exotherm during the oxidation step should be less than 100° C., and will be 50-60° C. if the flow rate and/or the oxygen concentration are dilute enough. If it is even less, the oxygen is so dilute that an excessively long time will be needed to accomplish the oxidation. There is a danger in exceeding 300° C. locally, since cobalt oxides interact with alumina and silica at temperatures above 400° C. to make unreducible spinels, and above 500° C., Ru makes volatile, highly toxic oxides.

Next, the reoxidized catalyst is then slowly reduced again in the presence of hydrogen, in the same manner as previously described in connection with the initial reduction of the impregnated catalyst. This second reduction is much easier than the first. Since nitrates are no longer present, this reduction may be accomplished in a single temperature ramp and held, as described above for reduction of calcined catalysts.

The composite catalyst of the present disclosure has an average particle diameter, which depends upon the type of reactor to be utilized, of from about 0.01 to about 6 millimeters; for example, from about 1 to about 6 millimeters for a fixed bed; and for example, from about 0.01 to about 0.11 millimeters for a reactor with the catalyst suspended by gas, liquid, or gas-liquid media (e.g., fluidized beds, slurries, or ebullating beds).

The charge stock used in the process of the present disclosure is a mixture of CO and hydrogen. Any suitable source of the CO and hydrogen can be used. The charge stock can be obtained, for example, by (i) the oxidation of coal or other forms of carbon with scrubbing or other forms of purification to yield the desired mixture of CO and $H_2$ or (ii) the reforming of natural gas. $CO_2$ is not a desirable component of the charge stocks for use in the process of the present disclosure, but it may be present as a diluent gas. Sulfur compounds in any form are deleterious to the life of the catalyst and should be removed from the CO—$H_2$ mixture and from any diluent gases.

The reaction temperature is suitably from about 160° to about 260° C., for example, from about 175° to about 250° C. or from about 185° to about 235° C. The total pressure is, for example, from about 1 to about 100 atmospheres, for example, from about 3 to about 35 atmospheres or from about 5 to about 20 atmospheres. It has been found that the use of pressures of at least 50 psi (3.4 atmospheres) using the low ruthenium catalysts of the present disclosure results in activities greater than that achievable with larger quantities of ruthenium at the same pressure.

The gaseous hourly space velocity based upon the total amount of feed is less than 20,000 volumes of gas per volume of catalyst per hour, for example, from about 100 to about 5000 v/v/hour or from about 1000 to about 2500 v/v/hour. If desired, pure synthesis gas can be employed or, alternatively, an inert diluent, such as nitrogen, $CO_2$, methane, steam or the like can be added. The phrase "inert diluent" indicates that the diluent is non-reactive under the reaction conditions or is a normal reaction product.

The synthesis gas reaction using the catalysts of the present disclosure can occur in a fixed, fluid or moving bed type of operation.

The following illustrative examples are intended to be non-limiting.

EXAMPLES

Example 1

Preparation of Catalyst Comprising 10 Weight % Co—0.25 Weight % Ru Supported on 72 Weight % ZSM-5 and 18 Weight % Alumina A catalyst of CoRu (10 weight % Co—0.25 weight % Ru) on ZSM-5 extrudates was prepared by impregnation in a single step. First, ruthenium nitrosyl nitrate was dissolved in water. Second, cobalt nitrate was dissolved in acetone. The two solutions were mixed together and then added to 1/16" extrudates of alumina (20 weight % alumina) bound ZSM-5 zeolite (Zeolyst CBV 014, Si/Al=40). After the mixture was stirred for 1 hour at ambient temperature, the solvent was eliminated by rotavaporation. Then the catalyst was dried in an oven at 120° C. overnight and finally calcined at 300° C. for 2 hours in a muffle furnace.

Example 2

Preparation of Catalyst Comprising 5 Weight % Co—0.125 Weight % Ru Supported on 76 Weight % ZSM-5 and 19 Weight % Alumina A catalyst of CoRu (5 weight % Co—0.125 weight % Ru) on ZSM-5 extrudates was prepared by impregnation in a single step. First, ruthenium nitrosyl nitrate was dissolved in water. Second, cobalt nitrate was dissolved in acetone. The two solutions were mixed together and then added to 1/16" extrudates of alumina (20 weight % alumina) bound ZSM-5 zeolite (Si/Al=40). After the mixture was stirred for 1 hour at ambient temperature, the solvent was eliminated by rotavaporation. Then the catalyst was dried in an oven at 120° C. overnight and finally calcined at 300° C. for 2 hours in a muffle furnace.

Example 3

Preparation of Catalyst Comprising 15 Weight % Co—0.375 Weight % Ru Supported on 68 Weight % ZSM-5 and 17 Weight % Alumina A multistep incipient wetness impregnation method was used to load alumina-bound ZSM-5 extrudates with 15 weight % Co and 0.375 weight % Ru. First, ruthenium nitrosyl nitrate was dissolved in water. Second, cobalt nitrate was dissolved in acetone. The two solutions were mixed together and half was added to 1/16" extrudates of alumina (20 weight % alumina) bound ZSM-5 zeolite (Si/Al=40). After the mixture was stirred for 1 hour at ambient temperature, the solvent was eliminated by rotavaporation. Then the catalyst was dried in an oven at 120° C. overnight and finally calcined at 300° C. for 2 hours in a muffle furnace. The second half of the solution was then added in an identical manner and also dried at 120° C. and calcined at 300° C.

Properties of the extrudate and catalysts of Examples 1-3 are set forth in Table 1.

volume % $O_2/N_2$ was passed up through the catalyst bed at 750 sccm for 10 hours to passivate the catalyst. No heating was applied, but the oxygen chemisorption and partial oxidation exotherm caused a momentary temperature rise. After 10 hours, the gas feed was changed to pure air, the flow rate was lowered to 200 sccm and the temperature was raised to 300° C. at a rate of 1° C./minute and then kept at 300° C. for two hours. At this point, the catalyst was cooled to ambient temperature and discharged from the glass tube reactor. It was transferred to a 316-SS tube reactor of 0.51" I.D. and placed in a clam-shell furnace. The catalyst bed was flushed with a downward flow of helium for a period of two hours, after which time the gas feed was switched to pure hydrogen at a flow rate of 500 sccm. The temperature was slowly raised to 120° C. at a temperature interval of 1° C./minute, held there for a period of one hour, then raised to 250° C. at a temperature interval of 1° C./minute and held at that temperature for 10 hours. After this time, the catalyst bed was cooled to 180° C. while remaining under a flow of pure hydrogen gas. All flows were directed downward.

TABLE 1

Catalyst Properties

| Catalyst | Catalyst Composition | Average Particle Diameter, nm | Dispersion, % | BET Surface Area, $m^2/g$ | External Surface Area, $m^2/g$ | Micropore Area, $m^2/g$ | Porosity % | Total Intrusion Volume, cc/g | Crush Strength, lb/mm | Acidity, µmol/g |
|---|---|---|---|---|---|---|---|---|---|---|
| Extrudate* | Alumina-Bound ZSM-5 | | | 382.3 | 179 | 204 | 41.1 | 0.296 | 1.38 | 260 |
| Example 1 | 10 weight % Co-0.25 weight % Ru/ZSM-5 | 7.22 | 13.78 | 309.0 | 145 | 164 | 33.4 | 0.241 | 2.39 | 130 |
| Example 2 | 5 weight % Co-0.125 weight % Ru/ZSM-5 | 4.38 | 22.73 | 338.2 | 162 | 176 | 36.0 | 0.276 | 2.14 | 160 |
| Example 3 | 15 weight % Co-0.375 weight % Ru/ZSM-5 | 9.10 | 10.94 | 285.2 | 131 | 154 | 31.9 | 0.211 | 3.08 | 120 |

*Si/Al ratio of 40.

Example 4

Activation of Bimetallic Catalysts

Ten grams of catalyst as prepared in Example 1 was charged to a glass tube reactor. The reactor was placed in a muffle furnace with upward gas flow. The tube was purged first with nitrogen gas at ambient temperature, after which time the gas feed was changed to pure hydrogen with a flow rate of 750 sccm. The temperature to the reactor was increased to 350° C. at a rate of 1° C./minute and then held at that temperature for six hours. After this time, the gas feed was switched to nitrogen to purge the system and the unit was then cooled to ambient temperature. Then a gas mixture of 1

Example 5

Fischer-Tropsch Activity

A catalyst prepared as described in Example 1 and activated as described in Example 4 was subjected to a synthesis run in which the catalyst was contacted with hydrogen and carbon monoxide in ratios between 1.5 and 2.0 at temperatures between 205° C. and 235° C., with a total pressure of 5-20 atm and a total gas flow rate of 2100-6000 cubic centimeters of gas (0° C., 1 atm) per gram of catalyst per hour.

Results are set forth in Table 2.

TABLE 2

| Time On Stream, hours | 232 | 254 | 278 | 302 | 326 | 394 | 419 | 440 |
|---|---|---|---|---|---|---|---|---|
| Temperature, °C. | 220 | 235 | 235 | 235 | 235 | 235 | 235 | 235 |
| Pressure, atm | 5 | 10 | 10 | 10 | 10 | 10 | 15 | 20 |
| $H_2$/CO nominal | 1.6 | 1.6 | 1.6 | 1.6 | 1.6 | 1.6 | 1.6 | 1.6 |
| Flow, mL/h/g | 2100 | 6000 | 6000 | 6000 | 6000 | 6000 | 6000 | 6000 |
| CO Conversion | 39.8% | 35.1% | 33.1% | 33.9% | 34.5% | 32.6% | 38.4% | 41.7% |
| $H_2$ Conversion | 50.5% | 43.0% | 44.7% | 44.8% | 45.3% | 43.7% | 51.3% | 55.6% |
| $CH_4$ selectivity | 11.2% | 12.6% | 13.6% | 13.3% | 12.6% | 13.0% | 12.3% | 11.9% |
| $C_2$, selectivity | 1.6% | 1.7% | 1.8% | 1.8% | 1.7% | 1.7% | 1.7% | 1.4% |
| $C_3$-$C_4$, selectivity | 10.5% | 10.8% | 11.9% | 11.6% | 11.1% | 11.4% | 8.9% | 7.9% |
| $C_{5+}$, selectivity | 76.7% | 74.9% | 72.7% | 73.3% | 74.6% | 73.9% | 77.4% | 79.0% |
| $C_{21+}$, selectivity | 0.5% | 2.0% | 0.0% | 0.0% | 0.0% | 0.0% | 0.0% | 0.0% |
| Hydrocarbon yield, g/g/h | 81 | 237 | 241 | 243 | 244 | 232 | 275 | 339 |

Example 6

Fischer-Tropsch Activity

A catalyst prepared as described in example 1 and activated as described in Example 4 was subjected to a synthesis run in which the catalyst was contacted with hydrogen and carbon monoxide in ratios between 1.6 and 2.0 at temperatures between 205° C. and 225° C. with a total pressure of 10 atm and a total gas flow rate of 978-1951 cubic centimeters of gas per gram catalyst per hour.

Results are set forth in Table 3.

TABLE 3

| Time On Stream, hours | 44 | 115 | 192 | 218 | 282 | 307 | 355 | 379 | 522 |
|---|---|---|---|---|---|---|---|---|---|
| Temperature, °C. | 205 | 215 | 220 | 220 | 220 | 220 | 220 | 225 | 225 |
| Pressure, psig | 132 | 132 | 132 | 132 | 132 | 132 | 132 | 132 | 264 |
| $H_2$/CO | 2 | 2 | 2 | 2 | 2 | 1.6 | 1.6 | 1.61 | 1.61 |
| Gas Hourly Space Velocity, SL/h/g | 1.049 | 1.049 | 1.049 | 1.049 | 1.049 | 0.978 | 0.978 | 1.951 | 1.951 |
| CO Conversion | 13.8% | 38.3% | 60.5% | 62.6% | 55.1% | 38.8% | 37.5% | 24.0% | 31.3% |
| $H_2$ Conversion | 24.8% | 41.6% | 62.1% | 61.8% | 56.4% | 48.0% | 45.4% | 26.8% | 35.5% |
| $CH_4$ selectivity | 17.8% | 20.0% | 12.5% | 11.9% | 12.4% | 11.4% | 11.7% | 12.9% | 10.9% |
| $C_2$, selectivity | 2.3% | 2.4% | 1.5% | 1.4% | 1.5% | 1.5% | 1.6% | 1.9% | 1.3% |
| $C_3$-$C_4$, selectivity | 16.1% | 14.0% | 8.4% | 7.7% | 8.7% | 9.7% | 10.0% | 12.5% | 8.1% |
| $C_{5+}$, selectivity | 63.1% | 62.9% | 77.2% | 78.5% | 76.9% | 76.9% | 76.3% | 72.2% | 79.3% |
| $C_{21+}$, selectivity | 0.2% | 2.7% | 5.8% | 3.8% | 3.3% | 5.2% | 3.9% | 2.3% | 4.3% |
| Hydrocarbon yield, g/g/h | 0.03 | 0.079 | 0.111 | 0.11 | 0.102 | 0.081 | 0.079 | 0.108 | 0.116 |

Example 7

Fischer-Tropsch Activity

A catalyst prepared as described in example 2 and activated as described in Example 4 was subjected to a synthesis run in which 20 grams of the catalyst was contacted with hydrogen and carbon monoxide in ratios between 1.6 and 1.8 at a temperatures of 220° C. with a total pressure of 10 atm and a total gas flow rate of 524.5-1049 cubic centimeters of gas per gram catalyst per hour. The data presented in Table 4 provides a comparison of one-through versus recycle operation. Lowering the feed rate provided an increase in conversion. No wax was made at the conditions tested.

Results are set forth in Table 4.

TABLE 4

| Time On Stream, hours | 23 | 118 | 191 | 219 | 285 | 315 | 333 |
|---|---|---|---|---|---|---|---|
| Temperature, °C. | 220 | 220 | 220 | 220 | 220 | 220 | 220 |
| Pressure, psig | 132 | 132 | 132 | 132 | 132 | 132 | 132 |
| $H_2$/CO | 1.60 | 1.80 | 1.80 | 1.80 | 1.80 | 1.80 | 1.80 |
| Feed Flow, sccm | 350 | 350 | 350 | 350 | 175 | 175 | 175 |
| Gas Hourly Space Velocity, SL/h/g | 1.049 | 1.049 | 1.049 | 1.049 | 0.5245 | 0.5245 | 0.5245 |
| Recycle Flow, sccm | 0 | 0 | 350 | 350 | 350 | 350 | 0 |
| CO Conversion | 35.8% | 42.5% | 29.5% | 31.9% | 52.1% | 45.8% | 43.4% |
| $H_2$ Conversion | 41.3% | 46.2% | 34.0% | 34.0% | 55.7% | 55.2% | 58.1% |
| Total Conversion | 39.2% | 44.9% | 32.4% | 33.2% | 54.4% | 51.9% | 52.9% |
| $CH_4$ selectivity | 10.8% | 10.4% | 12.5% | 11.7% | 12.1% | 12.5% | 12.4% |
| $C_2$, selectivity | 1.6% | 1.4% | 1.5% | 1.5% | 1.4% | 1.5% | 1.5% |

TABLE 4-continued

| | | | | | | | |
|---|---|---|---|---|---|---|---|
| $C_3$-$C_4$, selectivity | 10.4% | 9.0% | 10.5% | 9.5% | 7.6% | 7.5% | 10.1% |
| $C_{5+}$, selectivity | 76.7% | 78.8% | 75.0% | 76.8% | 78.3% | 77.9% | 75.3% |
| $C_{21+}$, selectivity | 4.0 | 1.1 | 1.3 | 0.9 | 0.3 | — | — |
| $CO_2$, selectivity | 0.5% | 0.4% | 0.5% | 0.4% | 0.5% | 0.6% | 0.7% |
| Hydrocarbon yield, g/g/h | 0.086 | 0.095 | 0.066 | 0.071 | 0.058 | 0.051 | 0.048 |

Example 8

Comparison of Impregnation with Non-aqueous Versus Aqueous Solution

Activity data for an alumina-bound ZSM-5, impregnated with 10 weight % Co—0.25 weight % Ru using aqueous or nonaqueous solution is set forth in Tables 5 and 6. Preparation using the nonaqueous solution was the same as example 1. While the aqueous version had 0.5 weight % Pd added in addition to 10 weight % Co and 0.25 weight % Ru, it is not believed that the Pd is responsible for the 60% difference in activity.

TABLE 5

| Reaction conditions | Selectivity | Catalyst impregnated using non-aqueous solution | Catalyst impregnated using aqueous solution |
|---|---|---|---|
| 205° C., 10 atm, $H_2$/CO = 1.6 | $C_{1-2}$, % | 9.6 | 12.1 |
| | $C_{3-4}$, % | 7.0 | 8.5 |
| | $C_{5-9}$, % | 28.5 | 30.9 |
| | $C_{10-25}$, % | 50.5 | 45.3 |
| | $C_{26+}$, % | 4.4 | 3.2 |
| 210° C., 10 atm, $H_2$/CO = 1.6 | $C_{1-2}$, % | 10.0 | 11.6 |
| | $C_{3-4}$, % | 7.1 | 8.1 |
| | $C_{5-9}$, % | 30.2 | 30.8 |
| | $C_{10-25}$, % | 49.0 | 47.0 |
| | $C_{26+}$, % | 3.7 | 2.5 |
| 205° C., 10 atm, $H_2$/CO = 2.0 | $C_{1-2}$, % | 11.9 | 13.8 |
| | $C_{3-4}$, % | 8.0 | 9.2 |
| | $C_{5-9}$, % | 30.7 | 33.9 |
| | $C_{10-25}$, % | 43.3 | 39.8 |
| | $C_{26+}$, % | 6.1 | 3.3 |

TABLE 6

| Reaction conditions | Catalyst impregnated using non-aqueous solution; Hydrocarbon yield, g/g/h | Catalyst impregnated using aqueous solution; Hydrocarbon yield, g/g/h |
|---|---|---|
| 205° C., 10 atm, $H_2$/CO = 2.0 | 0.187 | 0.116 |
| 205° C., 10 atm, $H_2$/CO = 1.6 | 0.155 | 0.098 |
| 210° C., 10 atm, $H_2$/CO = 1.6 | 0.200 | 0.123 |
| 215° C., 10 atm, $H_2$/CO = 1.6 | 0.264 | 0.157 |
| 215° C., 10 atm, $H_2$/CO = 1.6 | 0.277 | 0.161 |
| 215° C., 10 atm, $H_2$/CO = 1.6 | 0.283 | 0.163 |
| 215° C., 10 atm, $H_2$/CO = 1.6 | 0.204 | 0.127 |
| 215° C., 10 atm, $H_2$/CO = 2.0 | 0.231 | 0.138 |

Example 9

Relative Hydrogen Chemisorption Data

Relative hydrogen chemisorption data for 5-15 weight % Co plus 0.125-0.375 weight % Ru impregnated on alumina-bound ZSM-5 extrudates using non-aqueous solution is presented in Table 7. The data indicates 5-30% improvements in dispersion after ROR. Acidity was measured by isopropylamine adsorption and then desorption in a microbalance-mass spectrometer apparatus (i.e., decomposition to propylene+$NH_3$ at Brönsted acid sites). Dispersion was measured by $H_2$ desorption after reduction in $H_2$ to 300° C., cooling in $H_2$ to ambient temperature at 1 atm, then desorbing the adsorbed $H_2$ in flowing argon.

TABLE 7

| | | Catalyst BET Area $m^2$/g | Catalyst BET Area $m^2$/$g_{ZSM-5}$ | Dispersion, Average % | Particle Diameter nm | Crush Strength lb/mm | Acidity µmol/g | Acidity µmol/$g_{ZSM-5}$ |
|---|---|---|---|---|---|---|---|---|
| Bound 80 weight % ZSM-5 - 20 weight % alumina | Extrudate | 382 | 478 | N/A | N/A | 1.38 | 260 | 325 |
| 5 weight % Co - 0.125 weight % Ru/ 76 weight % ZSM-5 - 19 weight % alumina | Reduced Once ROR | 338 336 | 445 442 | 22.7 29.5 | 4.38 3.38 | 2.14 N/A | 160 N/A | 211 N/A |
| 10 weight % Co - 0.25 weight % Ru/ 72 weight % ZSM-5 - 18 weight % alumina | Reduced Once ROR | 309 308 | 429 428 | 13.8 17.5 | 7.22 5.68 | 2.39 N/A | 130 N/A | 181 N/A |
| 15 weight % Co - 0.375 weight % Ru/ 68 weight % ZSM-5 - 17 weight % alumina | Reduced Once Reduced & Oxidized | 285 279 | 419 411 | 10.9 11.4 | 9.1 8.81 | 3.08 N/A | 120 N/A | 176 N/A |

While various embodiments have been described, it is to be understood that variations and modifications may be resorted to as will be apparent to those skilled in the art. Such variations and modifications are to be considered within the purview and scope of the claims appended hereto.

What is claimed is:

1. A method of performing a synthesis gas conversion reaction, the method comprising contacting a hybrid Fischer-Tropsch catalyst comprising a zeolite extrudate comprising a ZSM-5 zeolite impregnated with cobalt and containing from 5% to 15% cobalt by weight of the hybrid Fischer-Tropsch catalyst with synthesis gas comprising hydrogen and carbon monoxide having a hydrogen to carbon monoxide ratio from 1.5 to 2.0 at a temperature from 160° C. to 260° C., a pressure of from 1 to 100 atm and a gaseous hourly space velocity less than 20,000 volumes of gas per volume of catalyst per hour; wherein products of the synthesis gas conversion reaction comprise:
    0-20 weight % $CH_4$;
    0-20 weight % $C_2$-$C_2$-$C_4$;
    50-95 weight % $C_{5+}$; and
    0-8 weight % $C_{21+}$.

2. The method of claim 1, wherein products of the synthesis gas conversion reaction comprise:
    5-15 weight % $CH_4$;
    5-15 weight % $C_2$-$C_4$;
    60-90 weight % $C_{5+}$; and
    0-8 weight % $C_{21+}$.

3. The method of claim 1, wherein products of the synthesis gas conversion reaction comprise:
    8-12 weight % $CH_4$;
    8-12 weight % $C_2$-$C_4$;
    75-80 weight % $C_{5+}$; and
    0-8 weight % $C_{21+}$.

4. The method of claim 1, wherein the hybrid Fischer-Tropsch catalyst is formed by the method comprising:
    impregnating a zeolite extrudate comprising a ZSM-5 zeolite with cobalt using a substantially non-aqueous solution comprising a cobalt salt to provide an impregnated zeolite extrudate; and
    activating the impregnated zeolite extrudate by a reduction-oxidation-reduction cycle conducted at a temperature in a range of about 100° to about 450° C.

5. The method of claim 4, wherein:
    a first reduction step of the reduction-oxidation-reduction cycle is conducted at a temperature in a range of about 200° to about 450° C.;
    an oxidation step of the reduction-oxidation-reduction cycle is conducted at a temperature in a range of about 250° to about 350° C.; and
    a second reduction step of the reduction-oxidation-reduction cycle is conducted at a temperature in a range of about 200° to about 450° C.

6. The method of claim 1, wherein the hybrid Fischer-Tropsch catalyst further comprises ruthenium.

7. The method of claim 6, wherein the hybrid Fischer-Tropsch catalyst contacts the synthesis gas at a temperature from 220° C. to 235° C., a pressure from 5 to 20 atm and a gaseous hourly space velocity from 2100 to 6000 mL of gas per gram of catalyst per hour, wherein products of the synthesis gas conversion reaction comprise:
    11.2-13.6 weight % $CH_4$;
    72.7-79.0 weight % $C_{5+}$; and
    0-2.0 weight % $C_{21+}$.

8. The method of claim 6, wherein the hybrid Fischer-Tropsch catalyst contacts the synthesis gas at a temperature from 205° C. to 225° C., wherein products of the synthesis gas conversion reaction comprise:
    0.2-5.8 weight % $C_{21+}$.

* * * * *